United States Patent [19]
Kisner

[11] Patent Number: 5,709,793
[45] Date of Patent: Jan. 20, 1998

[54] APPARATUS AND METHOD FOR IN-SITU APPLICATION OF CHEMICAL IN A SWIMMING POOL OR SPA

[76] Inventor: Kim T. Kisner, 2125 E. Balboa, Tempe, Ariz. 85282

[21] Appl. No.: 634,973

[22] Filed: Apr. 19, 1996

[51] Int. Cl.$^6$ .................................................. E04H 4/16
[52] U.S. Cl. ..................... 210/169; 210/198.1; 210/238; 239/140; 239/149
[58] Field of Search .................... 210/169, 198.1, 210/206, 238, 416.2; 134/22.1, 99.2; 239/140, 149

[56] References Cited

U.S. PATENT DOCUMENTS

| | | | |
|---|---|---|---|
| 4,836,920 | 6/1989 | Miller, Jr. | 210/169 |
| 4,906,384 | 3/1990 | Hamilton | 210/697 |
| 5,018,890 | 5/1991 | May | 401/46 |
| 5,045,211 | 9/1991 | Hamilton | 210/697 |
| 5,084,171 | 1/1992 | Murphy et al. | 210/238 |
| 5,108,514 | 4/1992 | Kisner | 134/22.1 |
| 5,422,001 | 6/1995 | Yagoda et al. | 210/238 |

Primary Examiner—Peter A. Hruskoci
Assistant Examiner—Betsey Morrison
Attorney, Agent, or Firm—Steven Lin

[57] ABSTRACT

An apparatus 10 or 15 and corresponding methods for applying chemical/acid wash solution 65 from a container 60 in a swimming pool/spa 100 to clean and remove stains, scale deposits, and the like from desired areas. The apparatus 10 or 15 generally has a frame 11 or 12 for receiving and holding the container 60 and a handle receiving portion 50 for attaching a handle/pole 40 to allow a user to grasp and move the apparatus 10 or 15 within the pool/spa 100 and to allow chemical/acid wash solution 65 to flow to desired areas. In one embodiment, frame 11 is made of tubular material and has a rectangular base 20 and a rectangular U-shaped brace portion 30. In another embodiment, frame 12 has two half portions 70 and 80. Frame 12 is generally made of a vinyl coated wire construction, and half portions 70 and 80 are generally semi-cylindrical vinyl coated wire structures. The half portions 70 and 80 are hingedly attached to each other so that the frame 12 can be moved between an open and closed position. A container 60 is secured within frame 12 by swinging open half portions 70 and 80, placing container 60 within frame 12, closing half portions 70 and 80. A conventional swimming pool or spa pole/handle 40 can be attached to apparatus 10 or 15, or a pole/handle 45 can be integrally attached to apparatus 10 or 15. The user can more accurately and precisely move the container 60 and control the amount of chemical/acid wash 65 that flows to an area by being able to directly move the handle 40 and apparatus 10 or 15 that holds the container 60. The acid wash solution can be a mixture of hydrochloric acid and oxalic acid, and the neutralizer can be a mixture of magnesium hydroxide or magnesium oxide slurry in a brine base solution of sodium carbonate, sodium bicarbonate, or sodium chloride in water.

25 Claims, 3 Drawing Sheets

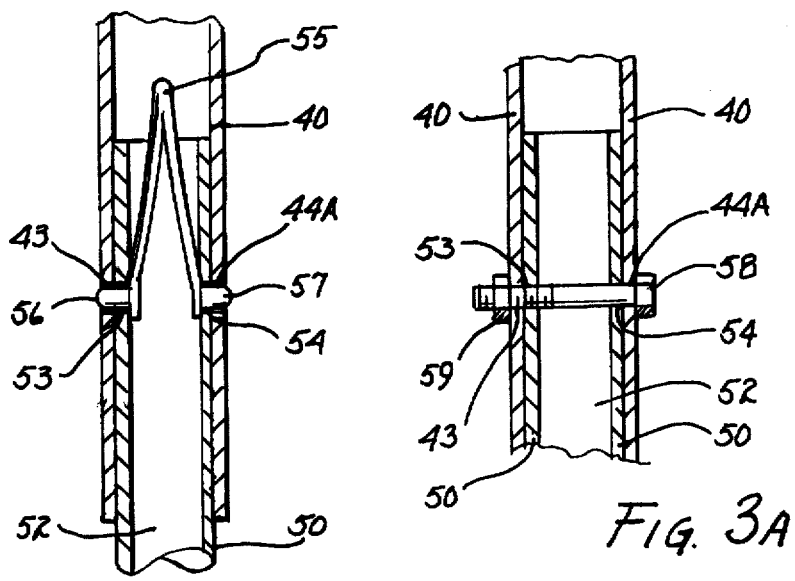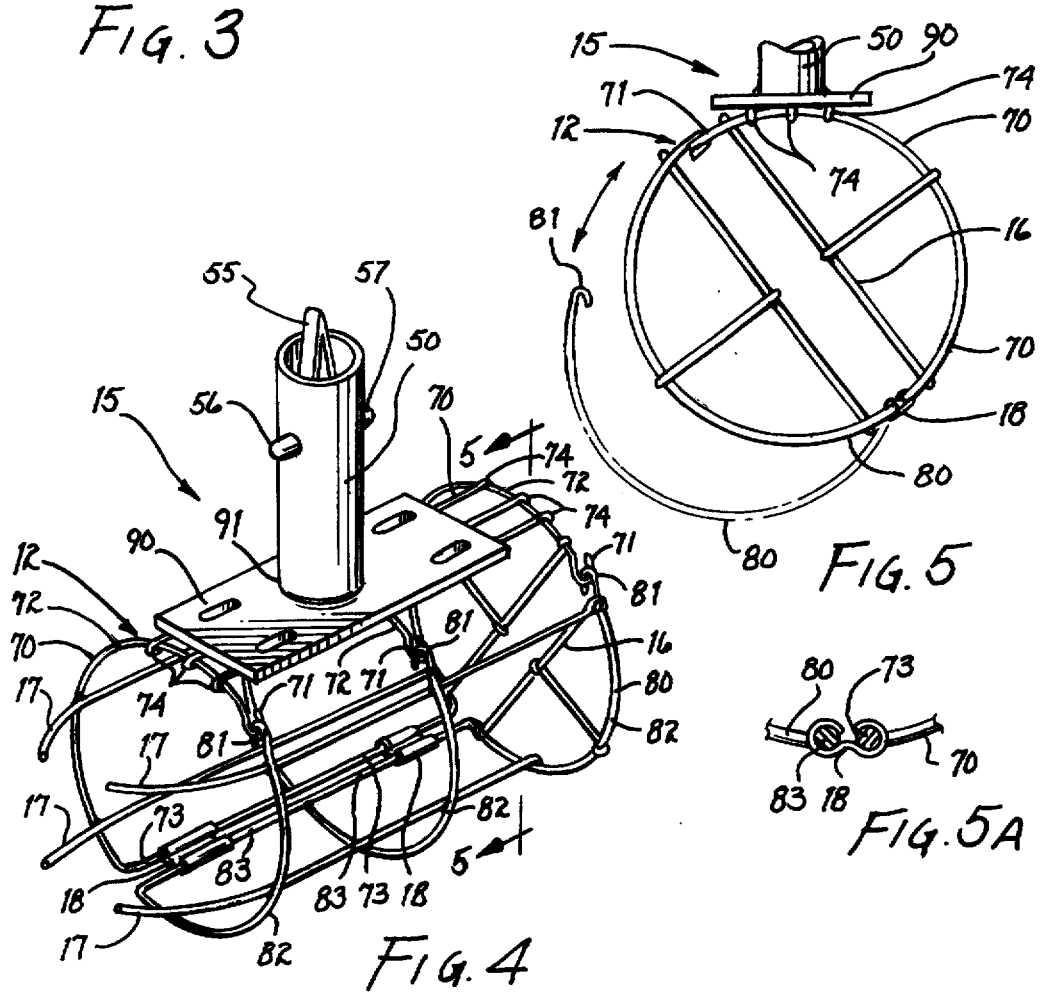

APPARATUS AND METHOD FOR IN-SITU APPLICATION OF CHEMICAL IN A SWIMMING POOL OR SPA

BACKGROUND OF THE INVENTION

1. Fields of Invention

The present invention relates to a device that is used for cleaning or removing stains, scale deposits, and the like from swimming pool or spas, and, more particularly, relates to an apparatus and method for applying chemicals in a swimming pool or spa to clean or remove stains, scale deposits, or the like from desired areas.

2. Discussion of Background and Prior Art

Swimming pool or spas require a considerable amount of maintenance and upkeep. Swimming pool or spas have to oftentimes be cleaned, and the water in the pool has to be periodically checked and treated. Common problems associated with swimming pool or spas are the existence of stains and the build-up of scale deposits (such as calcium deposits) on the swimming pool or spa surfaces (i.e. walls, floors, stairs, etc. of the swimming pool or spa). In the past, one method of generally cleaning or removing the stains, scale deposits, and the like would require that the water in the swimming pool or spa be drained from the pool so that the surface could be directly and more effectively treated and cleaned or acid washed.

Various types of acid washes have been developed to clean or remove stains, scale deposits, and the like from interior surfaces of swimming pool or spas that contain water, and the use of these acid washes avoids having to drain any water from the swimming pool or spa. U.S. Pat. No. 5,108,514 to Kisner ("Kisner I") discloses that these acid washes can be made from a combination of relatively concentrated acid which does not produce metal ions, such as hydrochloric acid and a relatively strong metal chelating agent, such as EDTA and/or its derivatives. Furthermore, U.S. Pat. Nos. 4,906,384 and 5,045,211 to Hamilton disclose that these acid washes can be made from various types of acid combinations such as hydrochloric acid, sulfamic acid, and sodium bisulfate. These acids are mixed with water individually and poured directly into the pool to acidify the water. This method, however, is costly, time consuming, and not that effective.

Kisner I also generally discloses in-situ methods for cleaning swimming pool or spas without draining the water. The disclosed methods use the acid wash solutions described in the Kisner I patent or any equivalent acid washes which are stored and transported in plastic jugs or bottles. Kisner I teaches that the cap of the container is removed from the neck to expose an open mouth of the container. The opened neck is tipped or tilted toward the wall surfaces of the pool and the container is lowered and allowed to sink down the side towards the bottom surface of the swimming pool or spa. The acid wash solution spills from the container and generally onto the interior surfaces or sides of the pool. As the container slides along the wall surface towards the bottom surface, the acid wash pours out of the open mouth directly onto the side or wall surfaces and over the stains, scale deposits, etc. which are to be removed.

Kisner I further teaches that an instrument such as a brash apparatus may be used to insure that the acid wash solution is spilled to the wall or bottom surfaces. The brash apparatus is used in conjunction with a conventional swimming pool or spa handle or pole, and the brash apparatus includes a brush portion that is preferably made of a wire construction. The handle or pole of the brash apparatus can be contacted to the bottom of the container, and/or the brash portion can contact a side portion of the container in order to adjustably position the bottle to insure that the acid wash solution spills or pours directly onto the interior wall or bottom surfaces. Furthermore, the handle and the brush portion can be positioned to hold or trap the container against a wall surface at a point near the bottom surface to insure that the vertical wall of the pool receives adequate exposure to the flowing acid wash solution. After the acid wash solution has emptied from the container, carbon dioxide results from the reaction of hydrochloric acid and scale deposits collects in the container and thereby enables it to rise to the water surface so that it can be retrieved and re-used.

However, the disadvantages of using an instrument such as the brush apparatus to position or maneuver the container is that it may be difficult, awkward, or cumbersome to control the movement of the container. The user must use the brush apparatus or instrument to manipulate and position the container in the generally right direction, and the user will have difficulty moving or maneuvering the container in the precise direction. Also, the amount of acid wash applied to a desired or certain area cannot be fairly precisely controlled. The user may have to use a great deal of effort and energy to move the container. An amount of acid, therefore, may be wasted on areas that may not need cleaning or deposit removal. Also, the use of the brush apparatus to control the movement of the container would also be difficult or impossible if the swimming pool or spa water is cloudy, muddy, murky, etc. At times, the container also may not rise from underwater to the surface, and the brush instrument would be difficult to use to retrieve the container.

Kisner I also teaches alternate application apparatuses and methods that spray the acid wash onto the desired surfaces of the pool. Kisner I teaches the use of a spray gun assembly that includes a container (i.e. gallon plastic jug or bottle), a flexible tube or hose inserted in through the opening of the container to the bottom of the container, and a spray gun that is capable of drawing acid wash from the container up through the hose by a pumping means. Kisner I also teaches the use of a pressurized tank having a pressure regulator or control valve. The regulator or valve is attached to a tube or hose, and the tube or hose is attached to a wand or tube. A nozzle apparatus having a larger flared opening is attached to the wand or tube, and the acid wash solution is pressure sprayed through the flared opening of the nozzle apparatus.

These spray apparatuses methods provide better efficiency and accuracy for applying the acid wash solution to desired areas of the swimming pool or spa than the use of an instrument such as the brush apparatus. However, these spray apparatuses and methods may not be very convenient to use since the entire spray gun assembly or the entire pressurized tank apparatus have to be transported to various areas along the perimeter of the pool. The transport of these devices could be cumbersome or difficult for the user since there are a number of attached components or pieces for the spray gun assembly and the pressurized tank apparatus. Furthermore, the barrel of the spray gun or the tube or wand length of the pressurized tank apparatus have to be quite long in order to generally reach the bottom of the pool. The costs associated with these spray systems are most likely higher than the brush apparatus or other such devices since they generally have more components, are not as simple as the brush apparatus, and do not incorporate the use of existing swimming pool or spa equipment (i.e. conventional swimming pool or spa pole or handle).

Therefore, there is a need for an apparatus and method for applying chemical in a Swimming pool to clean or remove stains, scale deposits, or the like from desired areas that enables the user to more accurately and precisely control the movement of the chemical container and the amount of chemical to be applied to desired areas, that is simple to manufacture and use, that can incorporate the use of presently existing swimming pool or spa equipment, that enables direct and easy retrieval of the container, and that is cost effective for the user. It is an object of the present invention to overcome the problems and limitations of the prior art that has been discussed.

SUMMARY OF THE INVENTION

Set forth is a brief summary of the invention in order to solve the foregoing problems and achieve the foregoing and other objects, benefits, and advantages in accordance with the purposes of the present invention as embodied and broadly described herein.

Accordingly, it is an object and advantage of the present invention to provide an apparatus for in-situ application of chemical in a swimming pool or spa that has a frame that is adapted to receive and hold a container that is capable of holding swimming pool or spa chemical/acid wash solution and a handle receiving portion attached to the frame that is able to receive and hold a conventional pool or spa pole or handle which can be grasped by a user to allow the user to move the frame and the container in the swimming pool or spa and to allow the chemical/acid wash solution in the container to flow to desired areas of the swimming pool or spa.

It is one aspect and advantage of the present invention to provide an apparatus for in-situ application of chemical/acid wash solution to a swimming pool or spa in which the frame further includes a base and a brace portion attached to the base wherein the container is secured between the base and the brace portion.

It is a further aspect and advantage of the present invention to provide an apparatus for in-situ application of chemical/acid wash solution to a swimming pool or spa wherein the base is a rectangular, tubular frame base and the brace portion is a generally rectangular U-shaped, tubular frame portion having an open side and having at least two ends wherein the at least two ends are attached to the base.

It is a further aspect and advantage of the present invention to provide an apparatus for in-situ application of chemical/acid wash solution wherein the frame further includes two half portions of the frame wherein one of the two half portions is hingedly attached to the other of the two half portions so that the two half portions can be opened and closed so that the container can be secured to or released from the frame.

It is another object and advantage of the present invention to provide a method of applying chemical/acid wash solution in a swimming pool or spa that include the steps of providing a frame that is adapted to receive and hold a container that is capable of holding swimming pool or spa chemical/acid wash solution and attaching a pole/handle receiving portion to the frame that enables a pole/handle to be received and held wherein the pole/handle can be grasped by a user to allow the user to move the frame and the container in the swimming pool or spa and to allow the chemical/acid wash solution in the container to flow to desired areas of the swimming pool or spa.

It is a further aspect and advantage of the present invention to provide a method of applying chemical in a swimming pool or spa wherein the step of providing a frame further includes the steps of providing a base and attaching a brace portion to the base wherein the container is secured between the base and the brace portion.

It is a further aspect and advantage of the present invention to provide a method of applying chemical/acid wash in a swimming pool or spa wherein the step of providing a frame further includes the step of providing two half portions of the frame and hingedly attaching one of the two half portions to the other of the two haft portions wherein the two half portions can be closed and opened so that the container can be secured to and released from the flame.

It is another object and advantage of the present invention to provide a method of using an apparatus for in-situ application of chemical/acid wash solution in a swimming pool or spa that include the steps of providing a frame and a handle receiving portion that is attached to the frame, holding a container that is filled with swimming pool or spa chemical/acid wash solution generally within the frame, attaching a pole/handle capable of being grasped by a user to the pole/handle receiving portion, and using the pole/handle to move the frame and the container to desired areas of the swimming pool or spa to allow the swimming pool or spa chemical/acid wash solution in the container to flow to the desired areas.

It is another object and advantage of the present invention to provide chemical solutions used for cleaning a swimming pool or spa that include an acid wash solution that is a mixture of hydrochloric acid and oxalic acid and a neutralizer that is a mixture of magnesium oxide or magnesium hydroxide slurry in a brine base of sodium chloride or sodium carbonate or sodium bicarbonate.

It is another object and advantage of the present invention to provide an apparatus for in-situ application of chemical in a swimming pool or spa that includes a frame that is adapted to receive and hold a container that is capable of holding swimming pool or spa chemical and a handle that is integrally attached to the frame wherein the handle can be grasped by a user to allow the user to move the frame and the container in the swimming pool or spa and to allow the chemical in the container to flow to desired areas of the swimming pool or spa.

BRIEF DESCRIPTION OF THE DRAWINGS

FIG. 3 Side sectional view according to line 3—3 of FIG. 2 showing the handle/pole engaged and secured to the handle receiving portion by the use of a spring clip.

FIG. 3A Side sectional view of the handle/pole engaged and alternatively secured to the handle receiving portion by the use of a nut and a bolt.

FIG. 4 Perspective view of a second embodiment apparatus for in-situ application of chemical/acid wash solution in a swimming pool or spa.

FIG. 5 Back side view of the second embodiment apparatus for in-situ application of chemical/acid wash solution in a swimming pool or spa according to the line 5—5 of FIG. 4.

FIG. 5A Side sectional view of the hinge attachment of the second embodiment apparatus for in-situ application of chemical/acid wash solution in a swimming pool or spa.

DETAILED DESCRIPTION OF THE INVENTION

Figure 1:
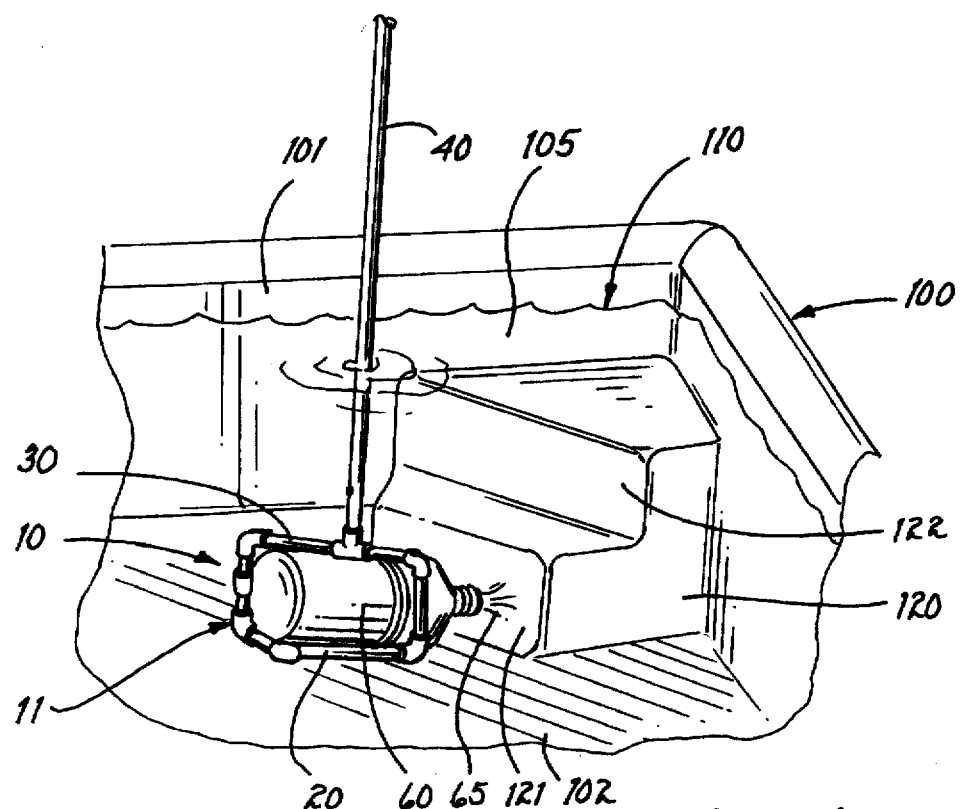
FIG. 1 Perspective view of the preferred embodiment apparatus for in-situ application of chemical/acid wash in a swimming pool or spa showing the apparatus holding a chemical/acid wash container and further showing the apparatus attached to a conventional swimming pool pole or handle wherein the apparatus is being used to clean desired areas of the swimming pool or spa.

The present invention generally discloses apparatuses 10 or 15 for in-situ application of chemical in a swimming pool or spa and methods of manufacturing and using such apparatuses. The apparatuses 10 or 15 can be adapted to receive and hold a container 60 of acid wash or swimming pool/spa chemical 65 and can also be adapted to receive a conventional swimming pool handle or pole 40. The handle/pole 40 can be gasped by a user to allow the user to move the apparatus holding the container 60 to allow the chemical or acid wash solution 65 in the container to flow to desired areas of the swimming pool or spa.

Any type of acid wash solution or swimming pool/spa chemical 65 can be used in conjunction with the present invention. For example, one type of acid wash solution 65 that can be used with the present invention is a mixture of hydrochloric acid and oxalic acid. The acid wash mixture comprises a solution of oxalic acid in water added to concentrated commercial hydrochloric acid or muratic acid. After the acid wash solution 65 is applied in the swimming pool/spa 100, a neutralizer of magnesium oxide or magnesium hydroxide slurry in a brine base of sodium chloride or sodium carbonate is placed into the swimming pool/spa to neutralize the acid. However, other types of acid wash solution or swimming pool/spa chemical 65 that can be filled and stored in a container such as container or bottle 60 can be used with the present invention as well. The present invention provides a chemical application apparatus that is simple in construction and cost effective for being able to directly and more accurately and precisely apply acid wash solution or chemical to desired areas of a swimming pool or spa and provides an apparatus that can incorporate the use of presently existing swimming pool/spa equipment such as a conventional swimming pool/spa handle or pole 40 and that enables direct and easy retrieval of the chemical/acid wash solution container.

Figure 2:
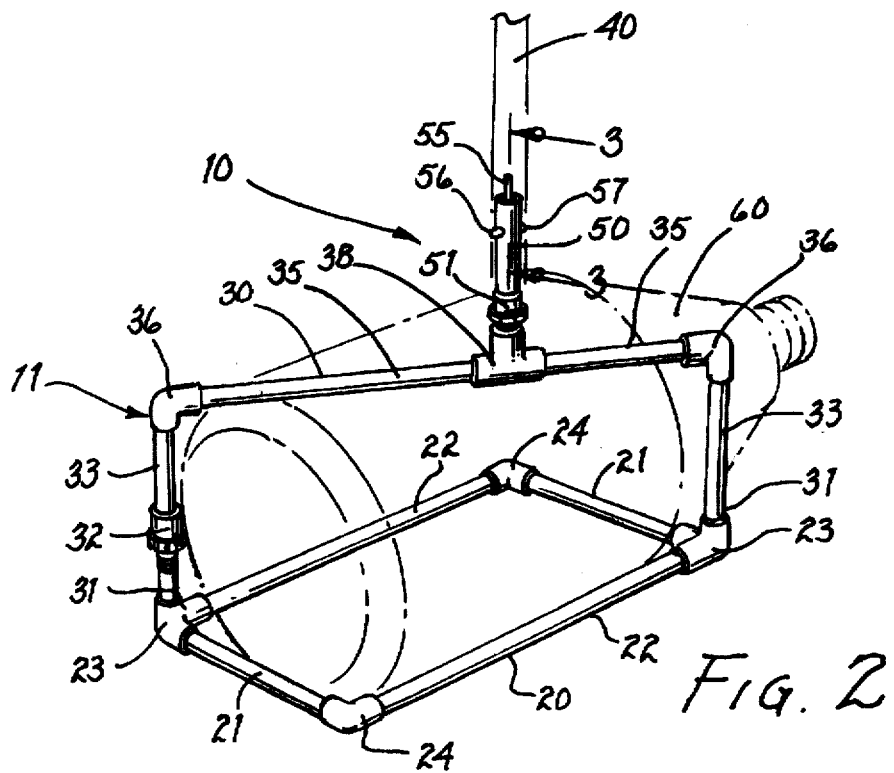
FIG. 2 Perspective view of the preferred embodiment apparatus for in-situ application of chemical/acid wash solution in a swimming pool or spa showing the chemical/acid wash container and the conventional swimming pool handle or pole in dotted lines.

FIGS. 1 and 2 show a preferred embodiment chemical application apparatus 10. Referring to FIG. 2, apparatus 10 generally has a flame 11 and a handle receiving portion 50. The frame 11 receives and holds a container 60 (i.e. shown in FIG. 1 and shown in dotted lines in FIG. 2) that is filled with acid wash solution or swimming pool/spa chemical 65. In this preferred embodiment, the container 60 can be either a generally square, rectangular, or cylindrical (i.e. round) bottle or jug. FIGS. 1 and 2 show container 60 as a cylindrical (i.e. round) bottle, but container 60 can be of any shape or form so long as it can fit within frame 11.

Frame 11 has a base 20 and a brace portion 30 that is attached to base 20. Frame 11 can be made of tubular material such as PVC or PVA tubing/piping and joints or any other such suitable materials. FIGS. 1 and 2 show that frame 11 has a rectangular, tubular frame base 20 and a brace portion 30 that is a generally rectangular U-shaped, tubular frame portion.

The rectangular tubular base 20 has two shorter tubular sides 21 and two longer tubular sides 22. Orthogonal tubular joints 23 and L-shaped tubular joints 24 are located and integrally attached at the comers (i.e. diagonal comers) of the rectangular base 20. The tubular sides 21 and 22 are held and attached together by the joints 23 and 24. The orthogonal tubular joints 23 are able to receive and hold ends 31 of brace portion 30.

The rectangular brace portion 30 has a tubular top portion 35 and two tubular side portions 33. Side portions 33 are each attached to an end of top portion 35 by joining the corresponding ends of side portions 33 and top portion 35 together using L-shaped joints 36 (i.e. see FIGS. 1 and 2). The top portion 35 and two side portions 33 are attached together to form the generally U-shaped open ended structure.

Brace portion 30 is attached to base 20 by attaching ends 31 of brace portion 30 to the orthogonal joints 23 that hold together the base 20. As shown in FIGS. 1 and 2, since the orthogonal joints 23 are located at diagonal comers of base 20, then the brace portion 30 will also be mounted and attached diagonally on rectangular base 20. Ends 31 of brace portion 30 are also mounted or attached perpendicularly to the base 20.

The tubing/piping and joints of frame 11 is attached together by screw/thread means, gluing, or any other type of suitable attachment method for these components. Furthermore, joints 32 are used as necessary to more easily or conveniently form portions or sides of the frame 11. For example, FIGS. 1 and 2 show that a joint 32 is used to conveniently form one of the side portions 33, and joint 32 is shown to be a straight vertical joint that couples two pieces of robing together.

In FIG. 2, a generally T-shaped tubular joint 38 is integrally attached in the top portion 35 of the brace portion 30. The T-shaped joint 38 is centrally located within the top portion 35. The T-shaped joint 38 can receive and secure to it a handle receiving portion 50. The handle receiving portion 50 receives and holds a handle or pole 40 (i.e. conventional swimming pool/spa handle or pole 40). The handle receiving portion 50 is attached to the frame 11 by attaching an end 51 of handle receiving portion 50 to the T-shaped joint 38 of bracing portion 30 as shown in FIG. 2.

Referring to FIGS. 2, 3, and 3A, the handle receiving portion 50 has a generally cylindrical portion 52 over which a portion of cylindrical handle 40 is received and held and further has securing component(s)/securing means to secure the handle 40 to the handle receiving portion 50. FIG. 3 shows that the securing component is a spring clip 55 that is generally located within the interior of the cylindrical portion 52 of handle receiving portion 50. The spring clip 55 has engaging components 56 and 57 that can be respectively pressed through openings 53 and 54 to the extent that the user can slide a portion of handle 40 over the handle receiving portion 50 (i.e. components 56 and 57 are generally pressed flush with the handle receiving portion 50 so that the handle 40 can be moved or rotated over the handle receiving portion 50). Openings 43 and 44A. on handle 40 are aligned to the engaging components 56 and 57, and the spring action of spring clip 55 causes components 56 and 57 to respectively spring through the openings 53 and 54 of handle receiving portion 50 and through openings 43 and 44A of handle 40 thereby locking and securing the handle 40 to the handle receiving portion 50.

FIG. 3A alternatively shows the securing component as a bolt 58 and a nut 59. The user slides handle 40 over handle receiving portion 50. Openings 43 and 44A of handle 40 are respectively aligned with openings 53 and 54 of handle receiving portion 50. The bolt 58 is inserted and threaded through the openings 44A, 54, 53, and 43, and the nut 59 is screwed to the bolt 58 to secure the cylindrical portion 52 of handle receiving portion 50 to the handle 40. The bolt 58 and nut 59 are made of suitable material such as metal or plastic.

Figures 6, 7:
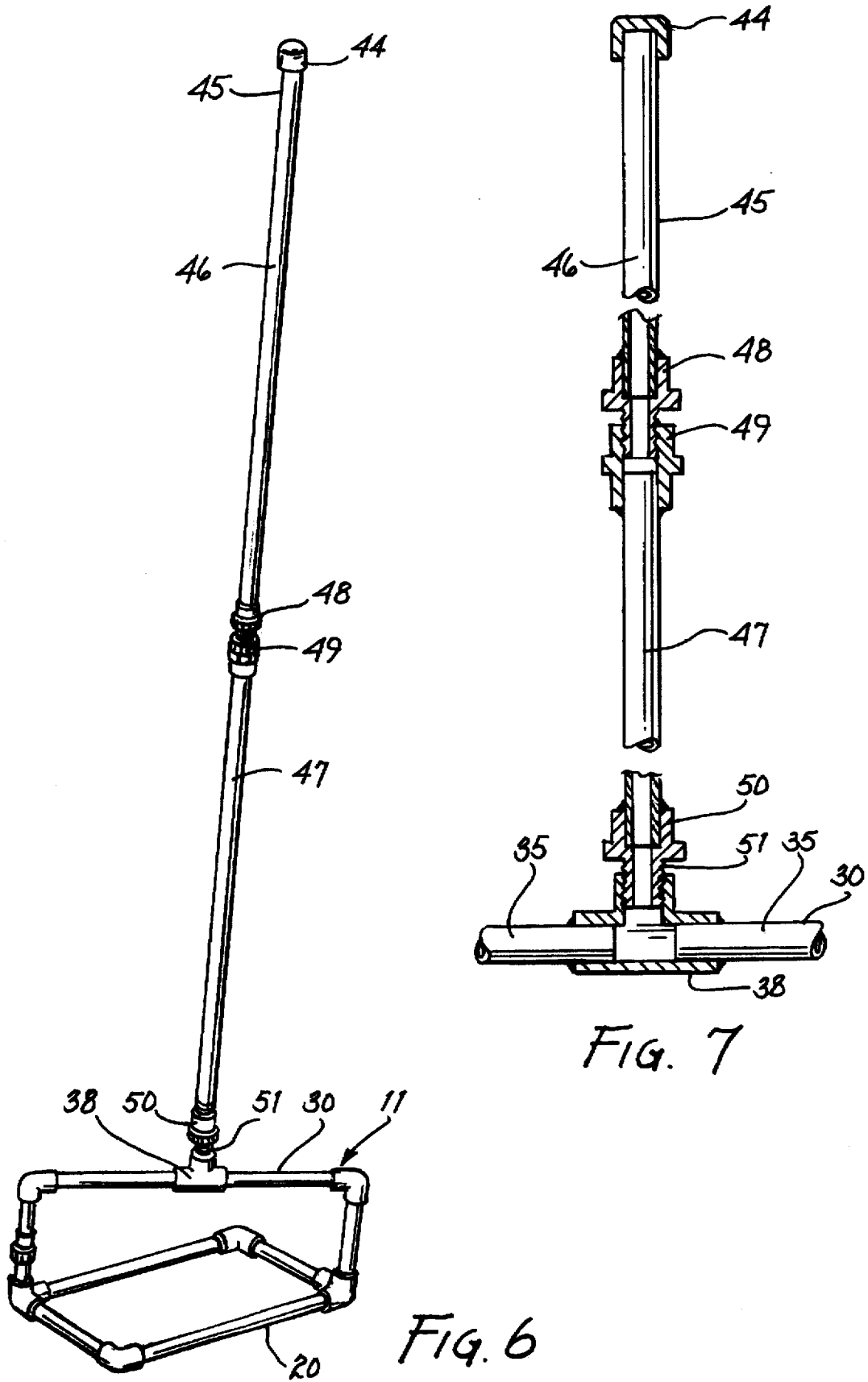
FIG. 6 Perspective view of the preferred embodiment apparatus for in-situ application of chemical/acid wash solution in a swimming pool or spa wherein the apparatus has an integrally attached pole or handle.
FIG. 7 Partial side sectional view of the preferred embodiment for in-situ application of chemical/acid wash solution in a swimming pool or spa apparatus as shown in FIG. 6 wherein sectional views of the integrally attached pole or handle are shown.

FIGS. 6 and 7 show apparatus 10 having an integrally attached pole or handle 45. Apparatus 10 has a handle receiving portion 50 that is a threaded joint. One end 51 oft he joint is attached to the frame 11 via T-shaped joint 38, and the other end of joint 51 receives the pole or handle 45. The pole or handle 45 is integrally attached to the apparatus 10 (i.e. including but not limited to gluing or molding these components together). In FIGS. 6 and 7, pole or handle 45 has upper portion 46 and lower portion 47. Upper portion 46 has a male threaded joint 48 at its lower end, and lower portion 47 has a female threaded joint 49 at its upper end. The upper portion 46 is attached to the lower portion 47 by attaching the male threaded joint 48 into female threaded joint 49. A cap 44 is located at the top end of upper portion 46.

Referring to FIG. 1, the container 60 is placed in a horizontal position. The user slides the container 60 into the frame 11 so that it is braced and secured between the base 20 and brace portion 30. The user removes the cap from the container 60 and leaves the mouth of the container 60 exposed. The user grasps the handle/pole 40 or 45 and inserts the apparatus 10 holding the container 60 filled with chemical or acid wash 65 into the water 105 and interior 110 of a swimming pool or spa 100. The chemical or acid wash 65 flows from the container 60 into the water 105 and to the areas that need to be cleaned or from which stains, scale deposits, and the like need to be removed. The user moves the apparatus 10 by moving the handle/pole 40 or 45 to desired locations of the pool or spa 100, such as walls 101, floor 102, or stairs 120 that need to be cleaned. The user is able to directly, accurately, and precisely control the placement and amount of flow of chemical/acid wash 65 to a desired area of the pool/spa 100. FIG. 1 shows an example in which the apparatus 10 is directly moved and generally held at an area 121 or 122 on stairs 120 for removing stains, scale deposits, or the like from that area. Furthermore, the user can directly and easily retrieve the container 60 simply by pulling the handle/pole 40 or 45 and apparatus 10 entirely out of the water 105.

Apparatus 10 having attached handle/pole 40 or 45 can also be used as a spot remover. A container filled with acid wash solution 65 (i.e. solution of oxalic acid in water added to concentrated hydrochloric acid or muratic acid) is fitted into the frame 11 so that it is braced and secured between the base 20 and brace portion 30. The cap from the container 60 is removed and the mouth of the container 60 is left exposed. The user grasps the handle/pole 40 or 45 and inserts the apparatus 10 holding the container 60 filled with acid wash solution 65 into the water 105 and at a location where a spot is to be removed. After the acid wash solution 65 is applied at the spot in the swimming pool/spa 100, the apparatus 10 is removed from the water. The container filled with acid wash solution 65 is removed from the apparatus 10, and a container filled with neutralizer (i.e. magnesium oxide or magnesium hydroxide slurry in a brine base of sodium chloride or sodium carbonate) is fitted into the frame 11 so that it is braced and secured between the base 20 and brace portion 30. The cap from the container 60 filled with neutralizer is removed and the mouth of the container 60 is left exposed. The user grasps the handle/pole 40 or 45 and inserts the apparatus 10 holding the container 60 filled with acid wash solution 65 into the water 105 and at the same location where the acid wash solution was applied to remove the spot.

FIGS. 4 and 5 show a chemical/acid wash application apparatus 15, which is an alternative preferred embodiment of the present invention. Referring to FIG. 4, apparatus 15 has a frame 12 and handle receiving portion 50 (i.e. the same handle receiving portion 50 as in the embodiment described earlier). The frame 12 receives and holds a container 60 that is filled with acid wash solution or swimming pool/spa chemical 65. In this preferred embodiment, the container 60 held within frame 12 of apparatus 15 is a cylindrical (i.e. round) bottle or jug. Container 60 can be of any other types of shape or size so long as it can fit within frame 12.

FIG. 4 shows that frame 12 has two half portions 70 and 80 in which one half portion 70 is hingedly attached to the other half portion 80 so that the two half portions 70 and 80 open and close. FIG. 5 shows that the flame 12 can be placed in an open position (i.e. half portion 80 shown in dotted lines). A container 60 filled with acid wash solution or swimming pool/spa chemical 65 is placed within the frame 12. The frame 12 is then moved to a closed position to secure the container 60 within the frame 12. After the chemical or acid wash solution 65 is applied to the swimming pool or spa 100, then the container 60 can be removed from the frame 12 by swinging and releasably opening the half portions 70 and 80.

FIGS. 4 and 5 show that the frame 12 is a generally cylindrical wire structure, (i.e. can be a vinyl coated wire structure or frame) and half portions 70 and 80 are each a semi-cylindrical wire structure. In FIG. 4, half portion 70 is made of several generally semi-circular hoops 72 (i.e. three hoops are shown in FIG. 4) to which generally straight wires 17 are horizontally attached across the semi-circular hoops 72. Half portion 70 has a straight wire 73 at its bottom side and has hooks 71 that append from the ends of hoops 72 which are generally located near the top side of half portion 70 (i.e. see FIGS. 4 and 5). FIG. 4 shows that half portion 80 is also made of several generally semi-circular hoops 82 (i.e. three hoops are shown in FIG. 4) to which generally straight wires 17 are horizontally attached across the semi-circular hoops 82. Half portion 80 has a straight wire 83 at its bottom side and has hooks 81 that append from the ends of hoops 82 which are generally located near the top side of half portion 80 (i.e. see FIGS. 4 and 5).

FIGS. 4 and 5 show one end of the frame 12 as generally comprising a flat wire pattern 16 that would receive, hold, and further secure the bottom of the container 60 within the frame 12. FIGS. 4 and 5 also show that straight wires 17 each have a wire portion that extends from the other end of the frame. These extension wire portions from straight wires 17 curve downward to contact and grasp the top of the container 60 and further secure the container 60 to the frame 12.

Half portions 70 and 80 are hingedly attached together by the use of hinges 18. Wire 73 of half portion 70 and wire 83 of half portion 80 are attached to the hinges 18 in the manner shown in FIGS. 4 and 5A. The hinges 18 allow the half portions 70 and 80 to swing between open and closed positions for securing or removing the container 60 to or from the flame 12. The container 60 is secured and locked within the frame 12 by opening the frame 12, placing the container 60 in the frame 12, dosing the frame 12, and engaging the corresponding hooks 71 and 81 of half portions 70 and 80. The container 60 can be removed by disengaging the corresponding hooks 71 and 81 and swinging open the half portions 70 and 80, and removing the container 60 from the frame 12. Hooks 71 and 81 can be wire end hooks as shown in FIGS. 4 and 5.

In FIGS. 4 and 5, half portion 70 has several top wires 74 (i.e. three wires 74 shown) that are attached across the length of the frame 12, and wires 74 are spaced apart in width at the top of half portion 70 The bottom surface of handle receiving base 90 is attached on top of the wires 74, and a handle receiving portion 50 (i.e. as described earlier) is attached to a location 91 on the top surface of handle receiving base 90 (i.e. the location 91 can be at a central area of the handle receiving base 90).

A handle/pole 40 can be attached and secured to the handle receiving portion 50 in the same manner as the embodiment that was described earlier (i.e. spring clip 55 with engaging portions 56 and 57 as shown in FIG. 4 or bolt 58 and nut 59, as discussed earlier and referred to in FIG. 3A, can be used to secure and lock the handle/pole 40 to the handle receiving portion 50). Alternatively, a pole/handle 45 can be integrally attached to the apparatus 15. After a handle/pole 40 or 45 and a container 60 filled with chemical/acid wash solution 65 are attached and secured to the apparatus 15, then the apparatus can be used in a swimming pool or spa 100 to clean or remove stains, scale deposits, and the like at desired areas in the same manner as apparatus 10 which was described earlier in this detailed description.

The present invention provides an apparatus 10 or 15 and method for applying chemical/acid wash solution in a swimming pool or spa 100 to clean or remove stains, scale deposits, or the like from desired areas that enables the user to more accurately and precisely control the movement of the chemical container 60 and the amount of chemical 65 to be applied to desired areas. The present invention can incorporate the use of presently existing swimming pool or spa equipment (i.e. conventional handle or pole 40) and enables direct and easy retrieval of the chemical/acid wash solution container. The present invention is simple to manufacture and use and is also cost effective to make as well.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable other skilled in the art to best utilize the invention in various embodiments and with various modifications as are suited to the particular use contemplated.

What is claimed is:

1. An apparatus for in-situ application of chemical in a swimming pool or spa comprising:

a frame for receiving, encompassing, and holding a container that is capable of holding swimming pool or spa chemical, and a handle receiving portion attached to the frame that is able to receive and hold a handle wherein the handle can be grasped by a user to allow the user to move the frame and the container in the swimming pool or spa and to allow the chemical in the container to flow to desired areas of the swimming pool or spa.

2. The apparatus for in-situ application of chemical according to claim 1 wherein the frame further comprises:

a base, and a brace portion attached to the base wherein the container is secured between the base and the brace portion.

3. The apparatus for in-situ application of chemical according to claim 2 wherein:

the base is a rectangular, tubular frame base, and the brace portion is a generally rectangular U-shaped, tubular frame portion having an open side and having at least two ends wherein the at least two ends are attached to the base.

4. The apparatus for in-situ application of chemical according to claim 3 wherein:

the at least two ends of the brace portion are perpendicularly attached to the base.

5. The apparatus for in-situ application of chemical according to claim 4 wherein:

one of the at least two ends of the brace portion is perpendicularly attached to one corner of the base, and another of the at least two ends of the brace portion is perpendicularly attached to a corresponding diagonal corner of the base.

6. The apparatus for in-situ application of chemical according to claim 5 further comprising:

orthogonal tubular joints integrally attached at the diagonal corners of the base that receive and hold the at least two ends of the brace portion perpendicularly to the base.

7. The apparatus for in-situ application of chemical according to claim 3 further comprising:

a generally T-shaped tubular joint integrally attached in a top portion of the brace portion to which the handle receiving portion is capable of being received and attached.

8. The apparatus for in-situ application of chemical according to claim 2 wherein:

the handle receiving portion is attached to the brace portion.

9. The apparatus for in-situ application of chemical according to claim 8 wherein:

the handle receiving portion is attached to a generally central portion of the brace portion.

10. The apparatus for in-situ application of chemical according to claim 1 wherein the handle receiving portion further comprises:

a generally cylindrical portion having one end attached to the frame and another end in which the handle is received and held over the cylindrical portion, and a securing component that is able to secure the handle to the cylindrical portion.

11. The apparatus for in-situ application of chemical according to claim 10 wherein:

the securing component is a spring clip generally located within the cylindrical portion having at least one engaging portion that can protrude from the cylindrical portion and allow the handle to slide over the cylindrical portion and engage and secure together the cylindrical portion and the handle.

12. The apparatus for in-situ application of chemical according to claim 10 wherein:

the securing component is a nut and a bolt wherein the bolt is inserted and threaded through the cylindrical portion and the handle and wherein the nut is screwed to the bolt to secure together the cylindrical portion and the handle.

13. The apparatus for in-situ application of chemical according to claim 1 wherein the frame further comprises:

two half portions of the frame wherein one of the two half portions is hingedly attached to the other of the two half portions so that the two half portions is capable of being opened and closed so that the container can be secured to or released from the frame.

14. The apparatus for in-situ application of chemical according to claim 13:

wherein the frame is a generally cylindrical wire frame, wherein each of the two half portions is a generally semi-cylindrical wire frame, and wherein a side of one of the two half portions is hingedly attached to a side of the other of the two half portions.

15. The apparatus for in-situ application of chemical according to claim 14 further comprises:

a handle receiving base having a top surface to which the handle receiving portion is attached and having a bottom surface to which another side of one of the two half portions is attached.

16. The apparatus for in-situ application of chemical according to claim 14 wherein another side of one of the two half portions and another side of the other of the two half portions have corresponding wire end hooks that engage to each other to secure the container within the cylindrical wire frame.

17. The apparatus for in-situ application of chemical according to claim 14 further comprising:

wire portions extending from an end of the cylindrical wire frame to further grasp and secure the container.

18. The apparatus for in-situ application of chemical according to claim 14 wherein the wire frame is a vinyl coated wire frame.

19. The apparatus for in-situ application of chemical according to claim 1 wherein the handle is a portion of a pole.

20. The apparatus for in-situ application of chemical according to claim 1 wherein the swimming pool or spa chemical held in the container is an acid washsolution.

21. The apparatus for in-situ application of chemical according to claim 20 wherein the acid wash solution held in the container is a mixture of hydrochloric acid and oxalic acid.

22. The apparatus for in-situ application of chemical according to claim 1 wherein the swimming pool or spa chemical held in the container is a neutralizer.

23. The apparatus for in-situ application of chemical according to claim 22 wherein the neutralizer held in the container is a mixture of magnesium oxide or magnesium hydroxide slurry in a brine base of sodium chloride or sodium carbonate or sodium bicarbonate.

24. An apparatus for in-situ application of chemical in a swimming pool or spa comprising:

a frame for receiving, encompassing, and holding a container that is capable of holding swimming pool or spa chemical, and a handle that is integrally attached to the frame wherein the handle is capable of being grasped by a user to allow the user to move the frame and the container in the swimming pool or spa and to allow the chemical in the container to flow to desired areas of the swimming pool or spa.

25. An apparatus for in-situ application of chemical in a swimming pool or spa comprising:

a holding component for receiving, encompassing, and holding a container that is capable of holding a swimming pool or spa chemical, and a handle receiving portion attached to the holding component wherein the handle receiving portion is able to receive and hold a handle in which the handle is capable of being grasped by a user to allow the user to move the holding component and the container in the swimming pool or spa and to allow the chemical in the container to flow to desired areas of the swimming pool or spa.

* * * * *